(12) United States Patent
Jordan

(10) Patent No.: US 10,690,213 B2
(45) Date of Patent: Jun. 23, 2020

(54) SEAL ARRANGEMENT WITH DAMPING ELEMENT

(71) Applicant: Trelleborg Sealing Solutions Germany GmbH, Stuttgart (DE)

(72) Inventor: Holger Jordan, Neuhausen auf den Fildern (DE)

(73) Assignee: TRELLEBORG SEALING SOLUTIONS GERMANY GMBH, Stuttgart (DE)

( * ) Notice: Subject to any disclaimer, the term of this patent is extended or adjusted under 35 U.S.C. 154(b) by 419 days.

(21) Appl. No.: 15/428,369

(22) Filed: Feb. 9, 2017

(65) Prior Publication Data
US 2017/0159740 A1 Jun. 8, 2017

Related U.S. Application Data

(63) Continuation of application No. PCT/EP2015/068546, filed on Aug. 12, 2015.

(30) Foreign Application Priority Data

Aug. 15, 2014 (DE) ........................ 10 2014 216 268

(51) Int. Cl.
*F16J 15/32* (2016.01)
*F16F 9/36* (2006.01)
(Continued)

(52) U.S. Cl.
CPC .......... *F16F 9/368* (2013.01); *F15B 15/1452* (2013.01); *F16F 1/36* (2013.01);
(Continued)

(58) Field of Classification Search
CPC ....... F16J 15/166; F16J 15/164; F16J 15/3208
See application file for complete search history.

(56) References Cited

U.S. PATENT DOCUMENTS 3,300,225 A * 1/1967 Shepler ................. F16J 15/166
277/584
3,469,853 A * 9/1969 Gullick .................... F16J 15/32
277/584
(Continued)

FOREIGN PATENT DOCUMENTS

CA 2371537 A1 8/2002
DE 34 25 431 C1 12/1985
(Continued)

*Primary Examiner* — Vishal A Patel
(74) *Attorney, Agent, or Firm* — Hackler Daghighian Martino & Novak

(57) ABSTRACT

A seal arrangement includes a first and a second machine element have a sealing gap and are movable in translation relative to one another. A seal element has a sealing lip arranged in a holding groove in the first machine element and which serves to seal off a low-pressure and high-pressure region. A rubber-elastically deformable preloading element in the holding groove serves to preload the seal element. At least one elastically deformable damping member is arranged between a low-pressure side groove flank and the seal element. A free space is formed between the damping member and the sealing surface. The damping member is compressed in the axial direction by the seal element when the high-pressure region is subjected to pressure and can be deformed freely into the free space. The damping member is of a material having a lower elasticity modulus than the seal element.

10 Claims, 11 Drawing Sheets

(51) Int. Cl.
*F16J 15/16* (2006.01)
*F16J 15/3204* (2016.01)
*F16J 15/3208* (2016.01)
*F15B 15/14* (2006.01)
*F16F 1/36* (2006.01)

(52) U.S. Cl.
CPC ............ *F16J 15/16* (2013.01); *F16J 15/164* (2013.01); *F16J 15/3204* (2013.01); *F16J 15/3208* (2013.01)

(56) References Cited

U.S. PATENT DOCUMENTS

| | | | | |
|---|---|---|---|---|
| 3,601,419 | A | * | 8/1971 | Fern ................ F16J 15/3236 277/436 |
| 4,020,910 | A | * | 5/1977 | Peterson ................ E21B 10/25 175/227 |
| 4,268,045 | A | * | 5/1981 | Traub ................ F16F 9/363 277/589 |
| 4,729,569 | A | * | 3/1988 | Muller ................ F16J 15/164 277/584 |
| 5,098,071 | A | * | 3/1992 | Umetsu ................ F16F 9/088 188/322.17 |
| 6,454,272 | B1 | | 9/2002 | Iversen |
| 6,648,337 | B1 | * | 11/2003 | Baehl ................ F16J 15/164 277/584 |
| 7,461,708 | B2 | * | 12/2008 | Yong ................ E21B 10/25 175/359 |
| 8,702,106 | B2 | * | 4/2014 | Berckenhoff ......... E21B 33/061 277/589 |
| 2009/0108542 | A1 | * | 4/2009 | Jordan ................ F16J 15/164 277/589 |

FOREIGN PATENT DOCUMENTS

| | | |
|---|---|---|
| DE | 36 06 886 A1 | 9/1987 |
| DE | 37 05 448 A1 | 9/1988 |
| DE | 39 31 163 A1 | 3/1990 |
| DE | 41 06 159 A1 | 9/1992 |
| DE | 10 2012 207 997 A1 | 11/2013 |
| GB | 2 202 285 A | 9/1988 |
| JP | 11-270691 A | 10/1999 |
| JP | 2002-267021 A | 9/2002 |
| JP | 2002-276814 A | 9/2002 |
| JP | 2006-38069 A | 2/2006 |
| WO | 91 04430 A1 | 4/1991 |
| WO | 9215807 A1 | 9/1992 |
| WO | 00 75539 A1 | 12/2000 |

* cited by examiner

SEAL ARRANGEMENT WITH DAMPING ELEMENT

CROSS-REFERENCE TO RELATED APPLICATIONS

This continuation application claims priority to PCT/EP2015/068546 filed on Aug. 12, 2015 which has published as WO 2016/023946 A1 and also the German application number 10 2014 216 268.8 filed on Aug. 15, 2014, the entire contents of which are fully incorporated herein with these references.

FIELD OF THE INVENTION

The invention relates to a seal arrangement comprising a first machine element and a second machine element, which are arranged spaced apart, forming a bearing or sealing gap, and in such a way as to be movable in translation relative to one another along a movement axis. The seal arrangement has a seal element having a sealing lip, at least a section of which is arranged in a holding groove in one of the two machine elements and by means of which a high-pressure region of the seal arrangement is sealed off from a low-pressure region of the seal arrangement. A rubber-elastic preloading element for preloading the seal element with the sealing lip thereof against a sealing surface of the other of the two machine elements is arranged in the holding groove.

BACKGROUND OF THE INVENTION

Seal arrangements of this kind have a broad range of applications in practice and are long-established in shock dampers and hydraulic actuators, for example.

The service lives of these seal arrangements depend decisively on the length of the life of the seal element used.

In operational use of the seal arrangement, the seal element is often subject to high mechanical loads. Thus, pressurization of the high-pressure region of the seal arrangement or translational relative movement of the two machine parts can lead to such high mechanical loads on the seal element that it may be excessively stressed and possibly even plastically deformed in the region of contact thereof with a groove flank, arranged on the low-pressure side, of the holding groove. In the extreme case, the seal element can be extruded under the loads into the sealing gap between the two machine parts. Overall, this is disadvantageous for the sealing capacity of the seal element and can lead to complete loss of functioning of the seal element. In practice, the seal element, which can be composed, for example, of a fluoro-rubber (FKM) or of a polytetrafluoroethylene (PTFE), which is capable of bearing higher thermal stress, must therefore be of sufficiently large dimensions to be able to adequately withstand the loads which occur during operation. However, larger dimensioning of the seal element can lead, in turn, to poorer cold shrinkage behavior of the seal element. The consequence can be a poorer friction coefficient and a poorer sealing capacity of the seal element in the low-temperature range.

It is therefore the object of the invention to develop the seal arrangement mentioned at the outset and a shock damper or hydraulic actuator provided therewith in such a way that the seal element thereof is better protected from excessive loads in operational use, thus enabling the seal element to be given smaller dimensions while maintaining the service life of the seal element unchanged and possibly also enabling it to be manufactured from a material which is less resistant to mechanical loads and has an even better friction coefficient than, for example, PTFE.

SUMMARY OF THE INVENTION

The object as it pertains to the seal arrangement is achieved by a seal arrangement having the features indicated in the first of the independent patent claims. The shock damper or hydraulic actuator according to the invention has the features indicated in the second of the independent claims.

Developments of the invention form the subject matter of the description, of the dependent claims and of the illustrative embodiments shown in the drawings.

According to the invention, the seal arrangement has an elastically deformable damping member for axial support of the seal element, at least a section of which member is arranged between a low-pressure-side groove flank of the holding groove and the seal element in the direction of the movement axis, i.e. in the axial direction. Here, the damping member is composed of a material having a lower elasticity modulus than the elasticity modulus of the material of the seal element.

In the pressurized operating state of the seal arrangement or in the case of an axial movement (concomitant movement), associated with the relative movement of the two machine elements, of the seal element in the direction of the low-pressure side of the seal arrangement, the seal element can be supported on the damping member. Under the axially directed force pressing the seal element against the damping member, the damping member is deformed elastically owing to its lower elasticity modulus in comparison with the material of the seal element. It is thereby possible to reliably counteract overloading and concomitant damage of the seal element, even in the case of high- or ultrahigh-pressure applications or high levels of acceleration of the translational relative movement of the two machine elements. Furthermore, the seal element can be given smaller dimensions overall, i.e. can be embodied with a smaller total volume, than is possible without such a damping member. This is advantageous in respect of the cold shrinkage behavior of the seal element. Moreover, the seal element can be composed of a material that is less resistant to mechanical loads without this having a negative effect on the operating life of the seal element. Thus, the seal element can be manufactured (composed) of a material which, on the one hand, is distinguished by a particularly low friction coefficient but which has hitherto been regarded as unsuitable for use in a seal arrangement mentioned at the outset owing to its low resistance to static/dynamic operational loads. Here, the reduced friction coefficient allows lower wear and an even broader technical range of applications of the seal arrangement. The damping member furthermore makes it possible to counteract possible unwanted vibrations in the seal arrangement caused by the stick-slip effect (stick-slip behavior) of the seal element resting on the sealing surface of the second machine part.

A free space is formed between the damping member and the sealing surface of the second machine part, into which space the damping member can be deformed elastically in the direction of the second machine element when subjected to the contact pressure force of the seal element, which is directed axially in the direction of the low-pressure side. Said free space thus ensures that the damping member can expand freely transversely to the movement axis. The free space is delimited in the radial direction by the sealing surface of the second machine element and an inner wall, facing the sealing surface, of the damping member. In other words, the free space extends continuously from the inner wall of the damping member to the sealing surface of the second machine element. The term "free space" is taken to mean a spatial volume of the seal arrangement in which no solid body, i.e. no component of the seal arrangement, is arranged. Overall, the deformation space required for the damping effect of the damping member is thereby made available. Moreover, it is thereby possible to enlarge an effective supporting surface of the damping member for the seal element in proportion to the contact pressure force of the seal element against the damping member, i.e. in proportion to an atmospheric pressure prevailing in the high-pressure region of the seal arrangement.

Even better protection of the seal element from overloading or damage is achieved according to the invention by virtue of the fact that the damping member partially covers the sealing gap in the axial direction, at least in the pressurized state of the seal arrangement (or of the high-pressure region). In this case, the damping member has the additional function of a barrier element, by means of which the clear width of the sealing gap can be partially shifted dynamically, i.e. in accordance with the contact pressure force acting on the damping member. It is thereby possible reliably to counteract the risk of plastic deformation of the seal element into the sealing gap formed between the two machine parts, i.e. extrusion of the seal element into the sealing gap, especially in high-pressure or ultrahigh-pressure applications.

According to the invention, it is possible, in particular, for the damping member to be designed in such a way that the damping member does not touch the sealing surface of the second machine part in the case of a predetermined maximum pressurization of the high-pressure side of the seal arrangement, i.e. a maximum contact pressure force of the seal element against the damping member. Otherwise, the damping member could affect a relative movement of the two machine elements.

According to the invention, the damping member can have a polygonal, round, oval or elliptical cross-sectional shape or even some other cross-sectional shape.

In its no-load state, the damping member can be arranged completely within the holding groove. In other words, the damping member does not protrude beyond the low-pressure-side groove flank in the direction of the second machine part, transversely to the movement axis, in its no-load state.

In the simplest design case, the damping member rests against the first machine element in a direction orthogonal to the movement axis in the no-load state, preferably by means of its end remote from the second machine element. In this case, the first machine element serves as an abutment for the damping member, with the result that the damping member is deformed substantially in the direction of the second machine element, depending on its axial compression by the seal element and in contact with the low-pressure-side groove flank. According to a preferred embodiment of the invention, the damping member can rest on or be supported on a shoulder or on the groove bottom of the holding groove of the first machine part.

It is self-evident that the damping member can be supported directly (immediately) or via the preloading element on the first machine element.

It has proven advantageous in terms of production engineering aspects if the damping member is arranged or placed loosely in the holding groove.

According to the invention, it is possible, in particular, for the damping member to be formed integrally with the preloading element. This is advantageous in respect of cost aspects and in respect of simplified installation of the seal arrangement.

According to a development of the invention, the damping member can be secured in part on the seal element or on the low-pressure-side groove flank of the holding groove.

According to the invention, the seal element can be arranged with axial play in the holding groove. It is thereby possible to adjust the response behavior of the seal arrangement or seal element in accordance with requirements.

For any pressure compensation that may be required between the low-pressure side and the high-pressure side of the seal arrangement ("pressure inversion situation"), the seal element can have a pressure compensation passage, through which the low-pressure side can be connected fluidically to the high-pressure side.

According to a development of the invention, the seal element can have a supporting section, which is arranged axially spaced apart from the sealing edge toward the high-pressure side and by means of which the seal element can be supported on the sealing surface.

The damping member can be composed, in particular, of a material that can be deformed elastically with a constant volume. It is thereby possible in a simple manner to establish a deformation of the damping member proportional to the pressure loading of the damping member, transversely to the movement axis. In this case, the damping member can be composed, in particular, of an elastomer. It is self-evident that the elastomer can contain additives, e.g. fibers and/or metal particles, in order to set the mechanical or thermal load bearing capacity thereof according to requirements.

According to an alternative embodiment of the invention, the material of the damping member can contain compressible air or gas inclusions, in particular carbon dioxide, nitrogen or other inert gas inclusions. In this case, the material of the damping element is not elastically deformable with a constant volume.

The seal element can be formed, in particular, from polytetrafluoroethylene or some other fluoropolymer, in particular a fluorinated copolymer, which preferably comprises PTFE monomers. It is self-evident that the above-mentioned materials can also contain additives.

According to the invention, one of the two machine elements can be designed as a housing or cylinder and the other of the two machine elements in each case can be designed as a piston rod guided in the housing/cylinder. In this case, the seal element is designed as a radial seal element. In this case, the preloading element and the damping member preferably have a continuous ring shape.

The seal arrangement according to the invention can be used in a large number of technical components. Thus, according to the invention, vibration or shock dampers, hydraulic actuators or hydraulic drives, especially on construction vehicles, can have a seal arrangement as explained above.

In summary, the invention relates to a seal arrangement comprising:
a first machine element and a second machine element, which are arranged spaced apart, forming a sealing gap, and in such a way as to be movable in translation relative to one another along a movement axis;
a seal element having a sealing lip, at least a section of which is arranged in a holding groove in the first machine element and which serves to seal off a low-pressure region (N) from a high-pressure region (H) of the seal arrangement;
a preloading element, which can be deformed with rubber elasticity, is arranged in the holding groove and serves to preload the seal element with the sealing lip thereof against a sealing surface of the second machine element; and at least one elastically deformable damping member for axial support of the seal element, at least a section of which member is arranged between a groove flank, arranged on the low-pressure side, of the holding groove and the seal element in the axial direction, and wherein the damping member is composed of a material having a lower elasticity modulus than the elasticity modulus of the material of the seal element.

BRIEF DESCRIPTION OF THE DRAWINGS

The invention is explained below by means of illustrative embodiments shown in the drawing. In the figures, the individual components are depicted in such a way that the functional interaction of the components is clarified.

In the drawings.

DETAILED DESCRIPTION OF THE PREFERRED EMBODIMENTS

Figure 1:
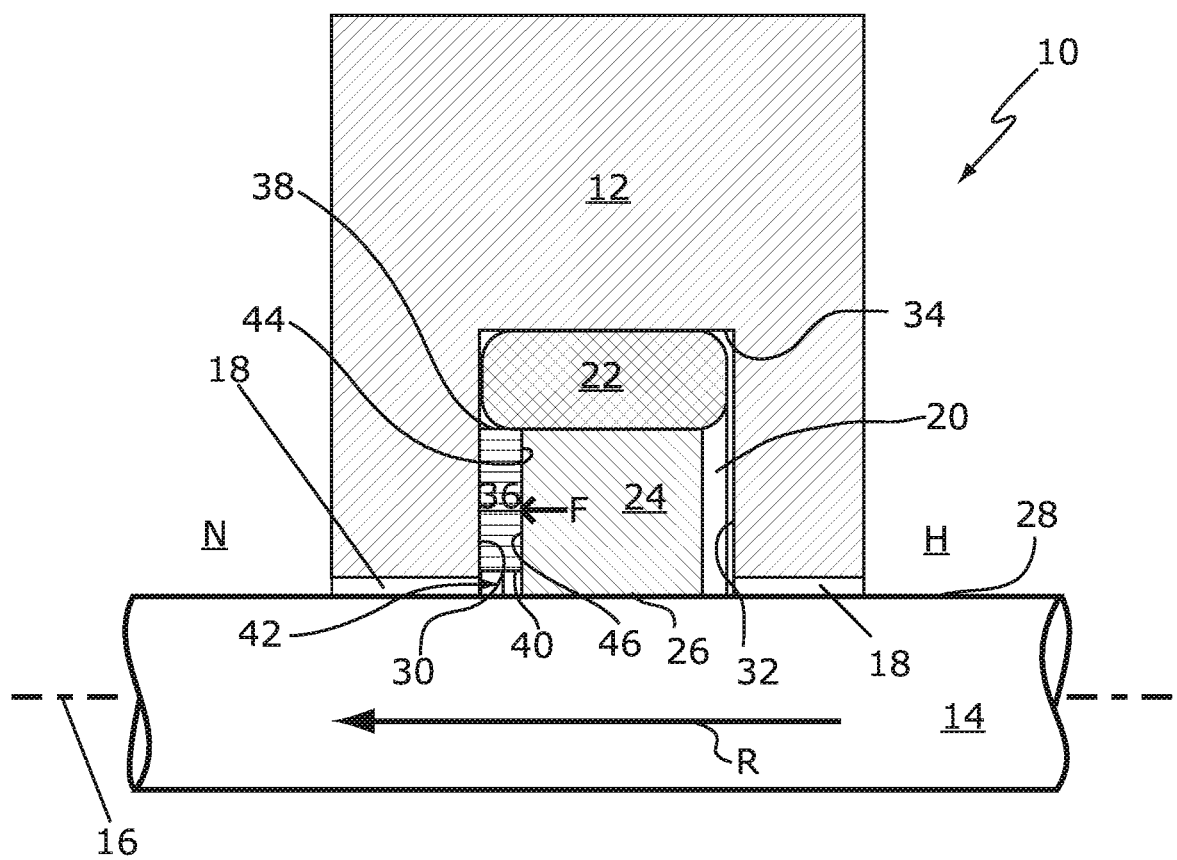
FIG. 1 shows a first illustrative embodiment of a seal arrangement according to the invention in the no-load state, having two machine elements, which are arranged spaced apart, forming a sealing gap, and in such a way as to be movable in translation relative to one another, wherein a high-pressure region H and a low-pressure region N of the seal arrangement are sealed off from one another by means of a sealing element arranged in a holding groove, and wherein the seal element is assigned a damping member, by means of which the seal element can be supported on a low-pressure-side groove flank of the holding groove.

FIG. 1 shows a seal arrangement 10 in a partial sectional illustration. The seal arrangement 10 comprises a first machine element 12 and a second machine element 14. The two machine elements 12, 14 are arranged in such a way as to be movable in translation relative to one another along a movement axis 16. By way of example, the first machine element 12 is designed as a housing and the second machine element 14 is designed as a piston rod guided in the housing.

The two machine elements 12, 14 are arranged spaced apart from one another, with the result that a bearing or sealing gap 18 is formed in a manner known per se between the two machine elements 12, 14.

The first machine part 12 has a holding groove 20. A rubber-elastic preloading element 22 and a seal element 24 are arranged in the holding groove 20. The preloading element 22 and the seal element 24 are each of annular design. In the present case, the seal element 24 has a rectangular cross-sectional shape but can also have a different cross-sectional shape deviating therefrom.

The preloading element 22 serves to preload the seal element 24 with its sealing lip 26 in the direction of and against a sealing surface 28 of the second machine element 14. The seal element 24 thus rests sealingly under preload against the sealing surface 28 of the second machine part 14. By means of the seal element 24, a high-pressure region (denoted by H) of the seal arrangement 10 and a low-pressure region (denoted by N) of the seal arrangement 10 are sealed off from one another.

In the case which is simplest in terms of design, the holding groove 20 can have a rectangular cross-sectional shape, as shown in FIG. 1. The holding groove 20 comprises a groove flank 30 arranged on the low-pressure side and a groove flank 32 arranged on the high-pressure side, which are connected to one another by a groove bottom 34. The preloading element 22 rests on the groove bottom 34 and is supported on the latter in a direction that is radial with respect to the movement axis 16.

As is apparent from FIG. 1, the seal element 24 is arranged with axial play in the holding groove 20. As an alternative, the seal element 24 can also be arranged so as to be held positively in the holding groove 20 in the axial direction.

The seal arrangement 10 has an elastically deformable damping member 36. The damping member 36 is arranged between the groove flank 30, arranged on the low-pressure side, of the holding groove 20 and the seal element 24 in the direction of the movement axis 16.

The damping member 36 allows support of the seal element 24 on the low-pressure side and also damping of an axial movement of the seal element 24 in the direction of the groove flank 30, arranged on the low-pressure side, of the holding groove 20.

The damping member 36 rests with its end 38 remote from the second machine element 14 on the rubber-elastic preloading element 22 and is supported (resiliently) by the preloading element 22 on the groove bottom 34 of the holding groove 20 of the first machine element 12.

The damping member 36 can be placed loosely in the holding groove 20 and, by way of example, is embodied in the present case as a component that is separate from the first machine part 12, the rubber-elastic preloading element 22 and the seal element 24.

The damping member 36 is composed of an elastically deformable material having a lower elasticity modulus than the elasticity modulus of the material of the seal element 24. This ensures that, in the pressurized state of the high-pressure region H and an associated pressing of the seal element 24 against the damping member 36, the damping member 36 is deformed more easily than the seal element 24 supported axially thereon.

The material of the damping member 36 does not have any (relevant) gas or air inclusions and can thus be deformed elastically with a constant volume.

The material of the seal element 24 can be a flexible fluoropolymer material, in particular a fluorinated copolymer material, for example. It is self-evident that the material of the seal element can contain so-called additives.

In the no-load operating state of the seal arrangement 10, the damping member 36 is arranged completely within the holding groove 20. The damping member 36 thus does not protrude in the direction of the sealing surface 28 with its inner wall 40 facing the sealing surface 28 of the second machine element 14 beyond the groove flank 30, arranged on the low-pressure side, of the holding groove 20. In other words, the internal cross section (not shown) of the damping member 36 is greater in the no-load operating state of the seal arrangement 10 than the passage cross section (not shown) of the first machine part 12.

A free space 42 is formed between the damping member 36 and the sealing surface 28 of the second machine element 14. The term free space 42 is taken to mean a spatial volume in which no solid body, i.e. no component of the seal arrangement 10, is arranged. The free space 42 extends continuously from the inner wall 40 of the damping member 36 to the sealing surface 28 of the second machine element 14 and is delimited by these two components in the radial direction.

In the pressurized state of the seal arrangement 10 or of the high-pressure region H, the seal element 24 is moved or pressed in the direction of and with a contact pressure force F against the damping member 36. The damping member 36 rests against the groove flank 30 arranged on the low-pressure side and is compressed in the axial direction by the contact pressure force F. As a result, the damping member 36 is deformed transversely to the movement axis 16 in the direction of the second machine element 14 and consequently in a radial direction into the free space 40 of the seal arrangement.

When the high-pressure region H is pressurized with a maximum operating pressure, the sealing gap 18 is partially covered in the axial direction by the damping member 36, as shown in the following FIG. 2.

The deformation of the damping member 36 into the free space 18 can enlarge an effective supporting surface 44 of the damping member 36 for the seal element 24 in proportion to the pressure. In this case, damage or extrusion of the seal element 24 into the sealing gap 18 can be reliably counteracted by the partial axial covering of the sealing gap 18.

Figure 2:
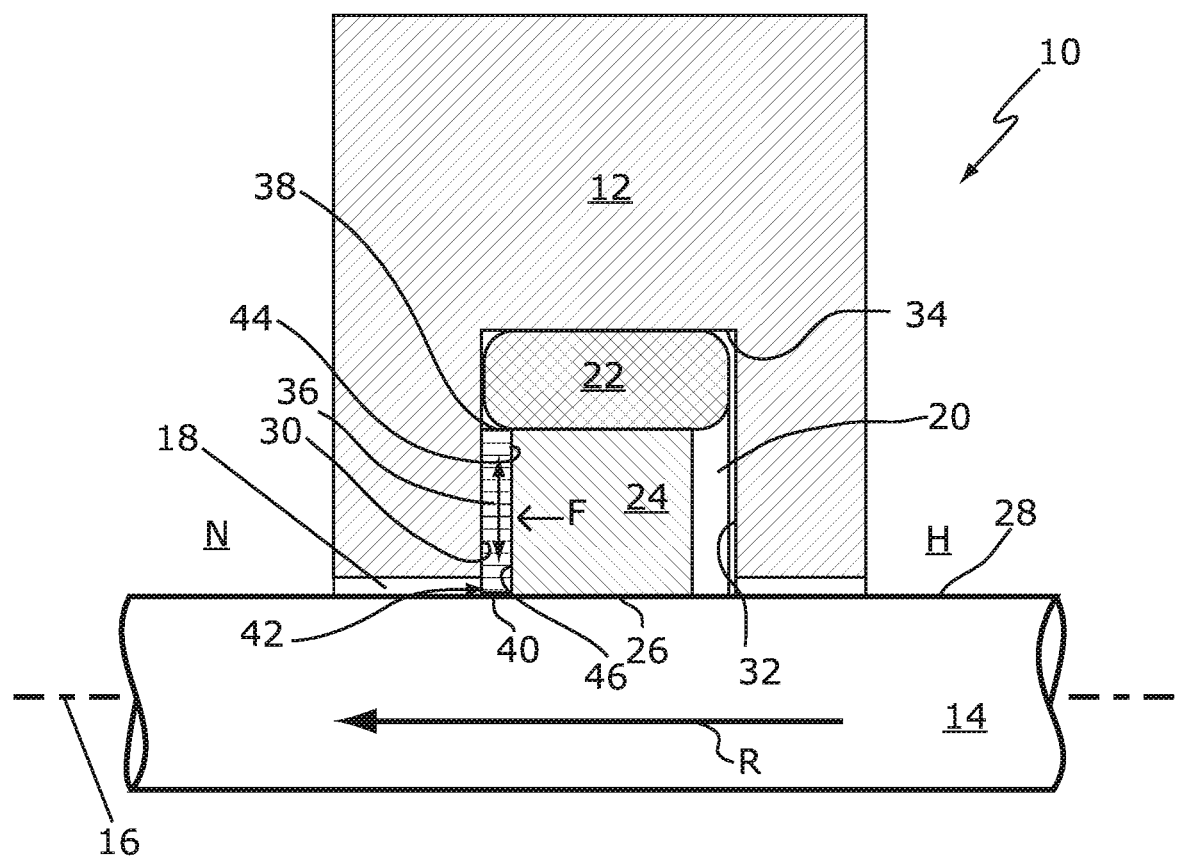
FIG. 2 shows the seal arrangement from FIG. 1 in a pressurized operating state, in a partial sectional illustration.

FIG. 2 shows the seal arrangement 10 from FIG. 1 in the pressurized state of the high-pressure region H and at a maximum operating pressure on the high-pressure side. The seal element 24 rests by means of its low-pressure-side side wall 46 against the damping member 36 and is supported on the damping member 36. As compared with the no-load state of the seal arrangement (and of the damping member 36) shown in FIG. 1, the damping member 36 is compressed in the axial direction by the seal element 24 and has been deformed into the free space 42 transversely to the movement axis 16, i.e. in a radial direction.

As is apparent from FIG. 2, the damping member 36 protrudes from the holding groove in the direction of the sealing surface 28 of the second machine part 14. The sealing gap 18 is thus partially covered by the damping member 36 in the axial direction. As a result, the damping member serves as a mechanical barrier element for the seal element 24 in the pressurized operating state of the seal arrangement 10, by means of which barrier element unwanted plastic deformation (extrusion) of the seal element 24 into the sealing gap 18 can be counteracted.

It should be noted that the inner wall 40 of the damping member 36 is arranged at a distance from the sealing surface 28 of the second machine part at the maximum operating pressure prevailing on the high-pressure side H of the seal arrangement 10. As a result, an unwanted increase in the frictional force between the two machine parts 12, 14 is reliably avoided.

Figure 3:
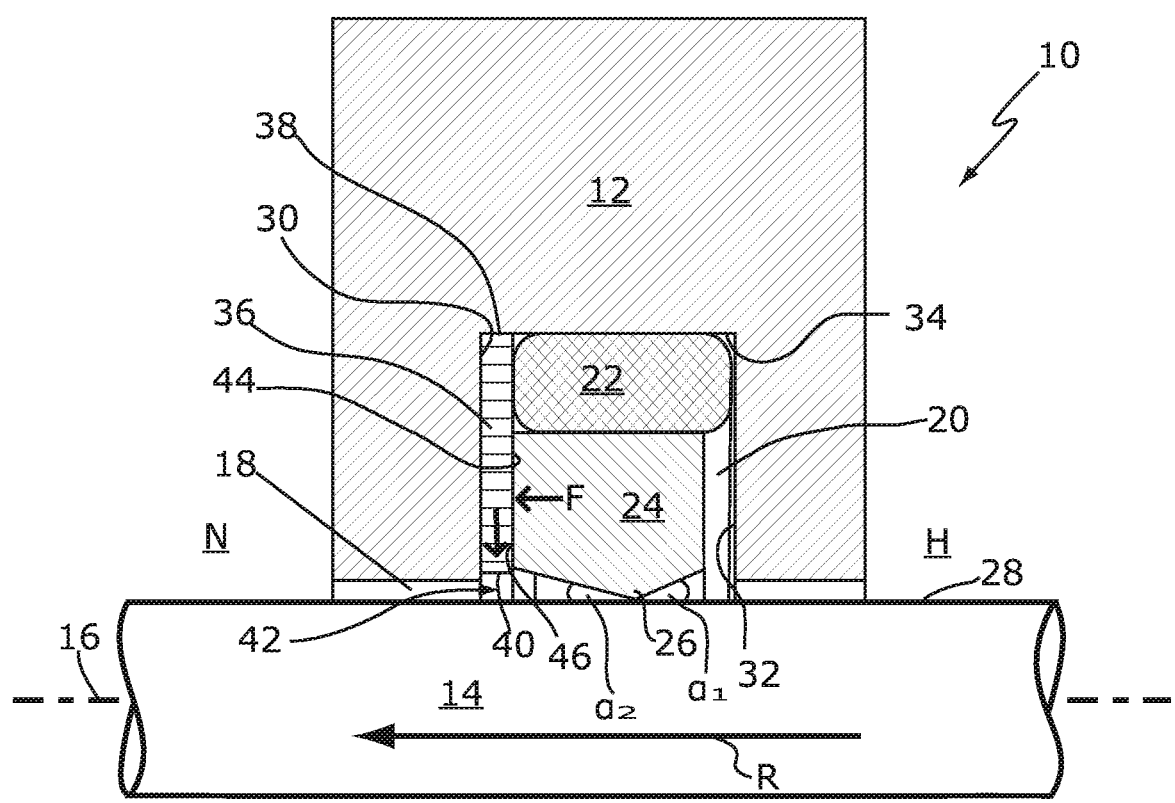
FIG. 3 shows another illustrative embodiment of the seal arrangement in a partial sectional illustration.

FIG. 3 shows another embodiment of a seal arrangement 10, which differs from the illustrative embodiment depicted in FIG. 1 essentially in that the damping member 36 is supported directly, i.e. immediately, on the first machine part 12. In particular, the damping member can rest on the groove bottom 34 of the holding groove 20 of the first machine element 12 and can be supported thereon—at least during the axially oriented compression thereof by the seal element 24. In the illustrated no-load operating state of the seal arrangement 10, the damping member 36 extends in a direction radial with respect to the movement axis 16 almost as far as the sealing gap 28. In other words, the damping member 36 has an internal cross section (not shown) in the no-load state which is larger than the passage cross section (not shown) of the first machine part 12.

As in the seal arrangement shown in FIG. 1, the damping member 36 is embodied as a component that is separate from the rubber-elastic preloading element 22 and from the seal element 24.

The seal element 24 has a sealing lip 26 with a contact surface angle $\alpha 1$ on the high-pressure side and a contact surface angle $\alpha 2$ on the low-pressure side, wherein $\alpha 1$ and $\alpha 2$ are each smaller than 90°. The contact surface angle $\alpha 1$ on the high-pressure side is preferably larger than the contact surface angle $a2$ on the low-pressure side.

Figure 4:
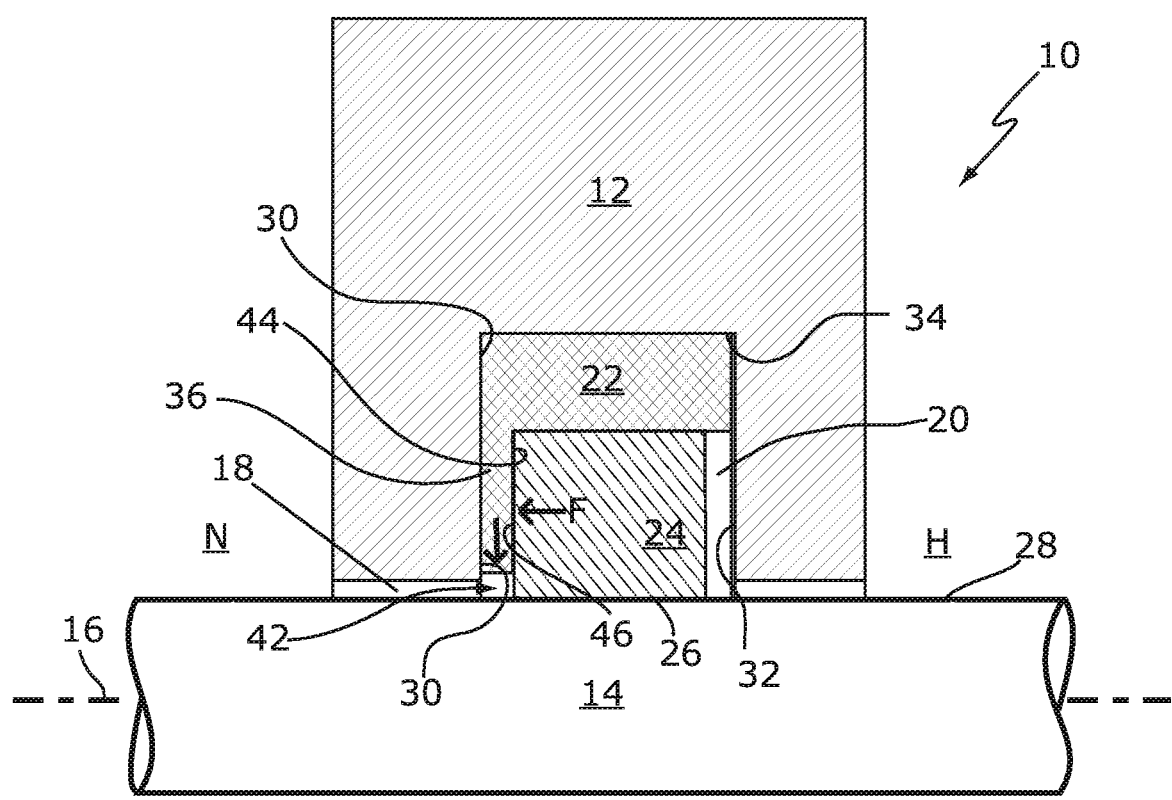
FIG. 4 shows another illustrative embodiment of the seal arrangement in a partial sectional illustration.

FIG. 4 shows another illustrative embodiment of the seal arrangement 10 in a partial sectional illustration. In this embodiment, the damping member 36 and the rubber-elastic preloading element 22 are embodied integrally with one another. By way of example, the seal element 24 has a rectangular cross-sectional shape. It is self-evident that the seal element can also have some other cross-sectional shape, e.g. the cross-sectional shape shown in FIG. 3.

Figure 5:
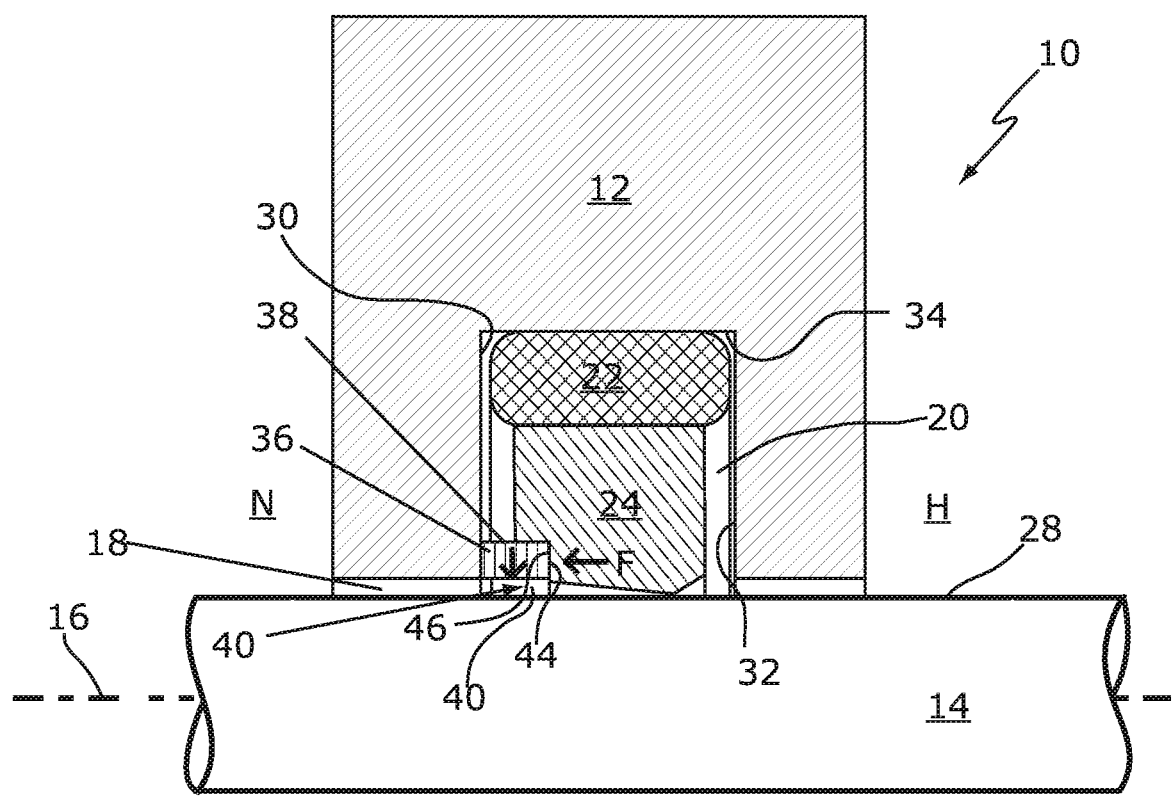
FIG. 5 shows another illustrative embodiment of the seal arrangement in a partial sectional illustration.

FIG. 5 shows another illustrative embodiment of the seal arrangement 10, in which the seal element 24 partially overlaps the damping member 36 radially from the outside. The damping member is thus supported on the seal element 24 itself in the radial direction.

In principle, the preloading element 22 capable of rubber-elastic deformation can also have some other cross-sectional shape.

Figure 6:
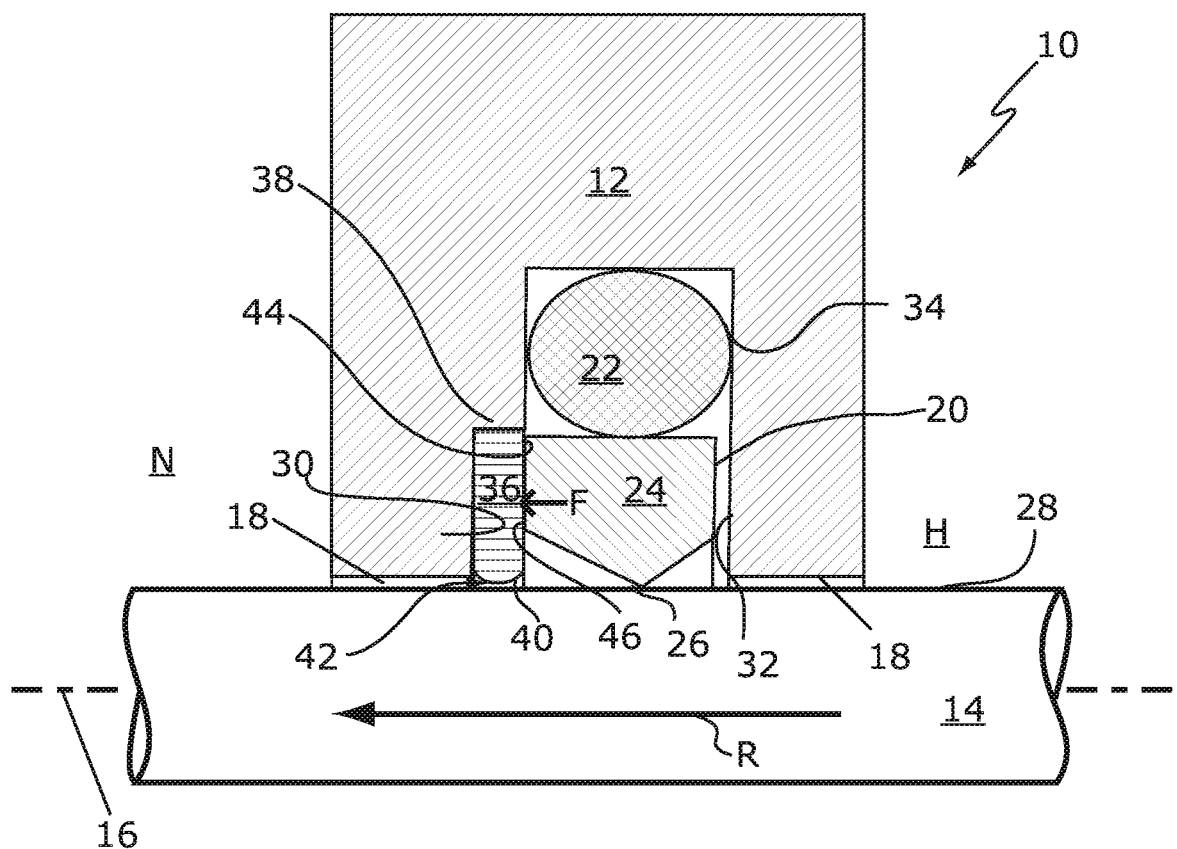
FIG. 6 shows another illustrative embodiment of the seal arrangement, in which the damping member has an arched inner side, in a partial sectional illustration.

In the seal arrangement 10 shown in FIG. 6, the preloading element 22 has a substantially oval or elliptical cross-sectional shape in the no-load state thereof. As is shown in the illustrative embodiment of the seal arrangement 10 according to the invention shown in FIG. 6, the damping member can have an arched inner wall 40.

According to a development of the invention, the damping member 36 can also be embodied so as to be plane convex or biconvex. In the latter case, the supporting surface 44 and the oppositely arranged groove contact surface 48 of the damping member 36 are arched outward, as shown in the seal arrangement 10 illustrated in FIG. 7.

Figure 7:
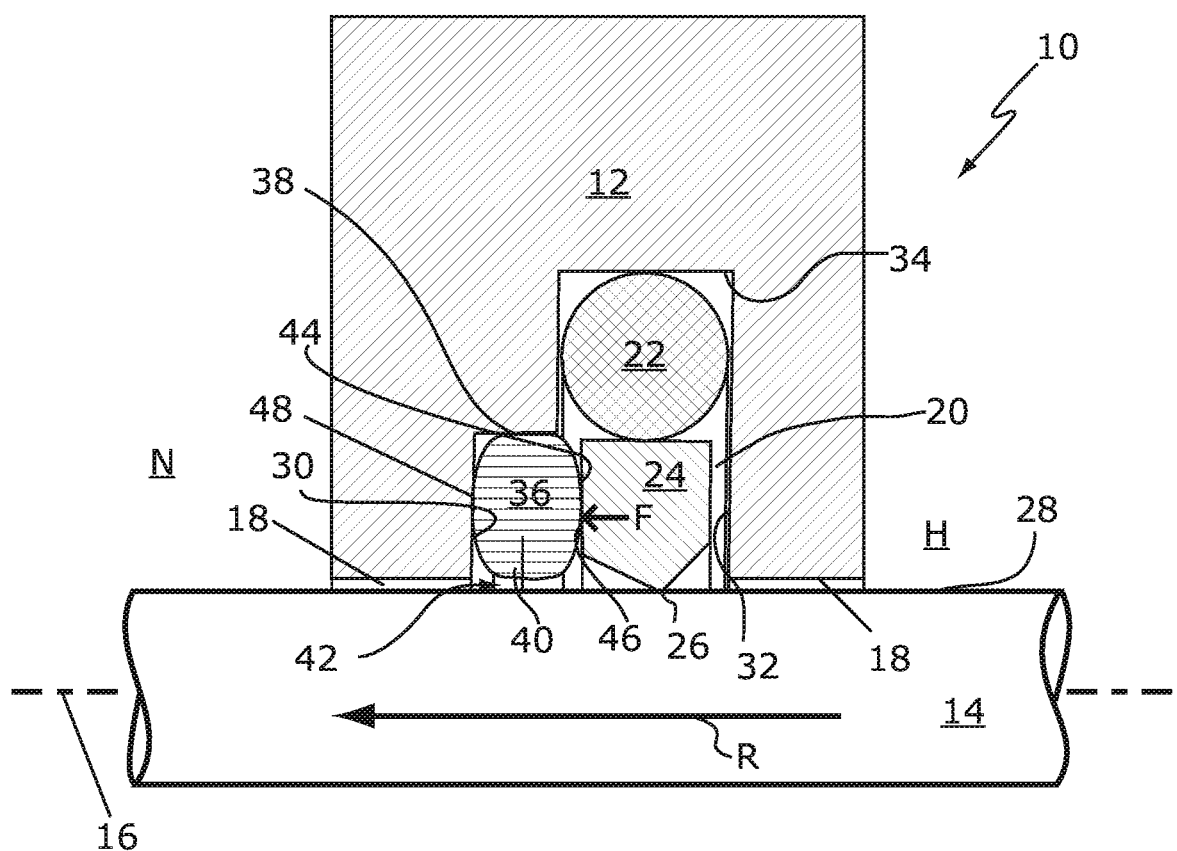
FIG. 7 shows a seal arrangement in which the damping member is of biconvex design, in a partial sectional illustration.

As shown in FIG. 7, the preloading element 22 can have a substantially round cross-sectional shape.

Figure 8:
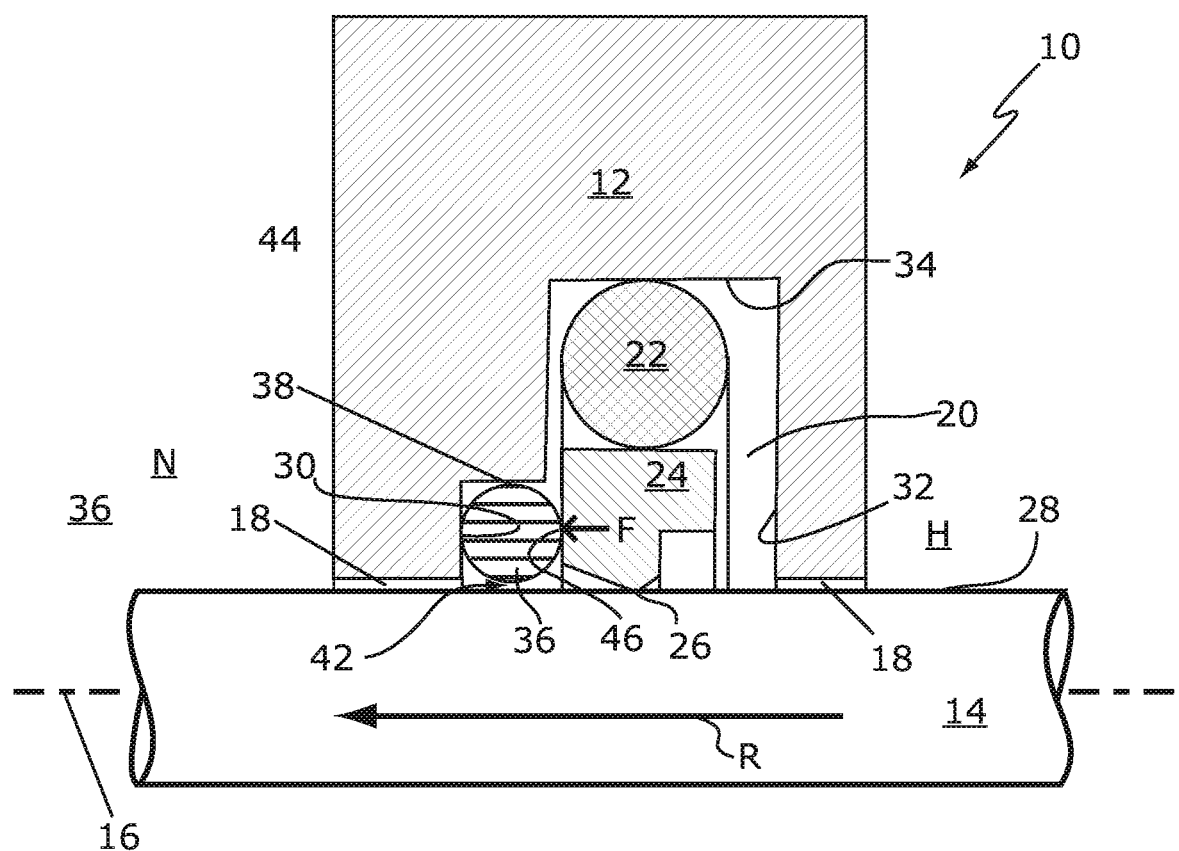
FIG. 8 shows a seal arrangement in which the damping member has a round or substantially round cross-sectional shape, in a partial sectional illustration.

FIG. 8 shows another seal arrangement 10, in which the seal element 24 is embodied in a stepped manner in the high-pressure-side surface region of the seal element 24.

Figure 9:
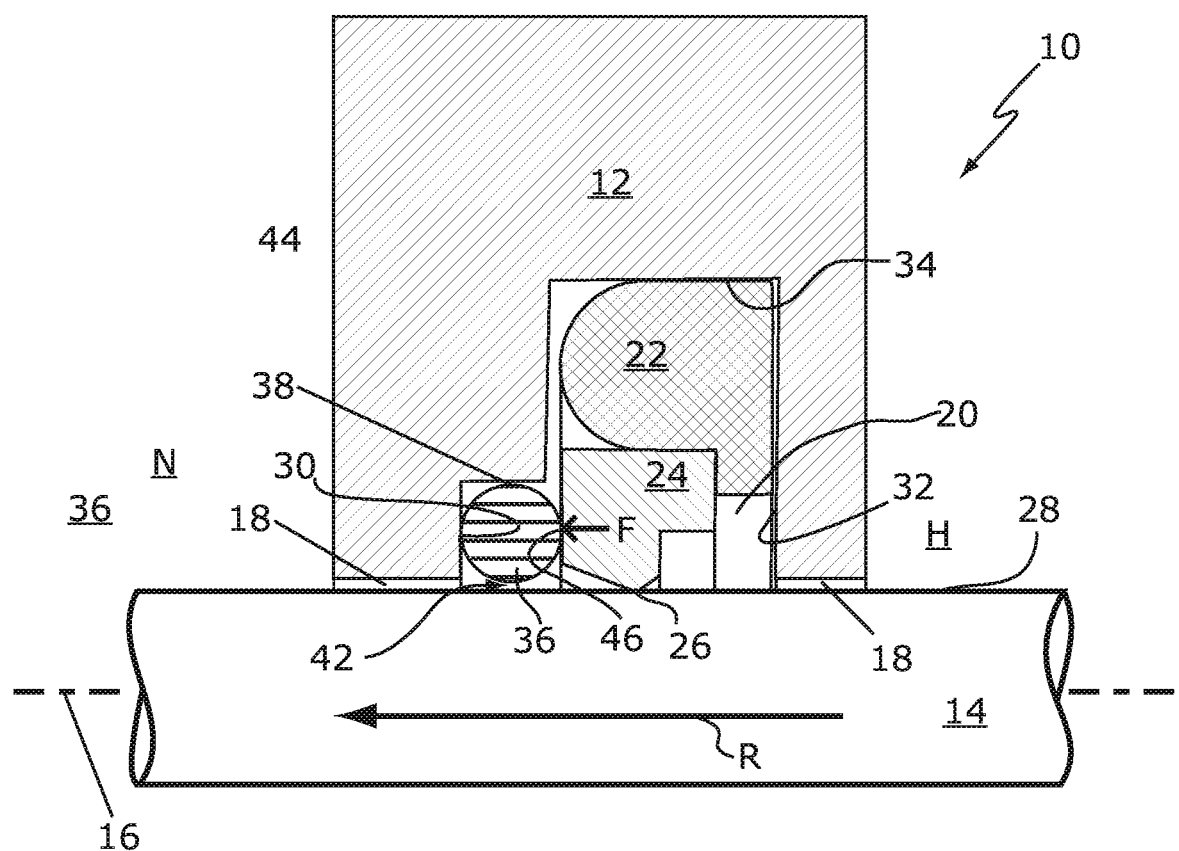
FIG. 9 shows a seal arrangement in which the preloading element overlaps the seal element axially, in a partial sectional illustration.

As is the case in the seal arrangement 10 shown in FIG. 9, the preloading element 22 can overlap the seal element 24 in an axial direction on the high-pressure side. In this case, the preloading element 22 itself acts as a high-pressure-side damping member for the seal element. In operational use of the seal arrangement 10, the seal element can thereby be protected from a hard impact against the groove flank 32 and damage resulting therefrom, even in the case of a movement in the direction of the high-pressure side (e.g. in the event of a rapid pressure compensation between the high-pressure side H and the low-pressure side N).

Figure 10:
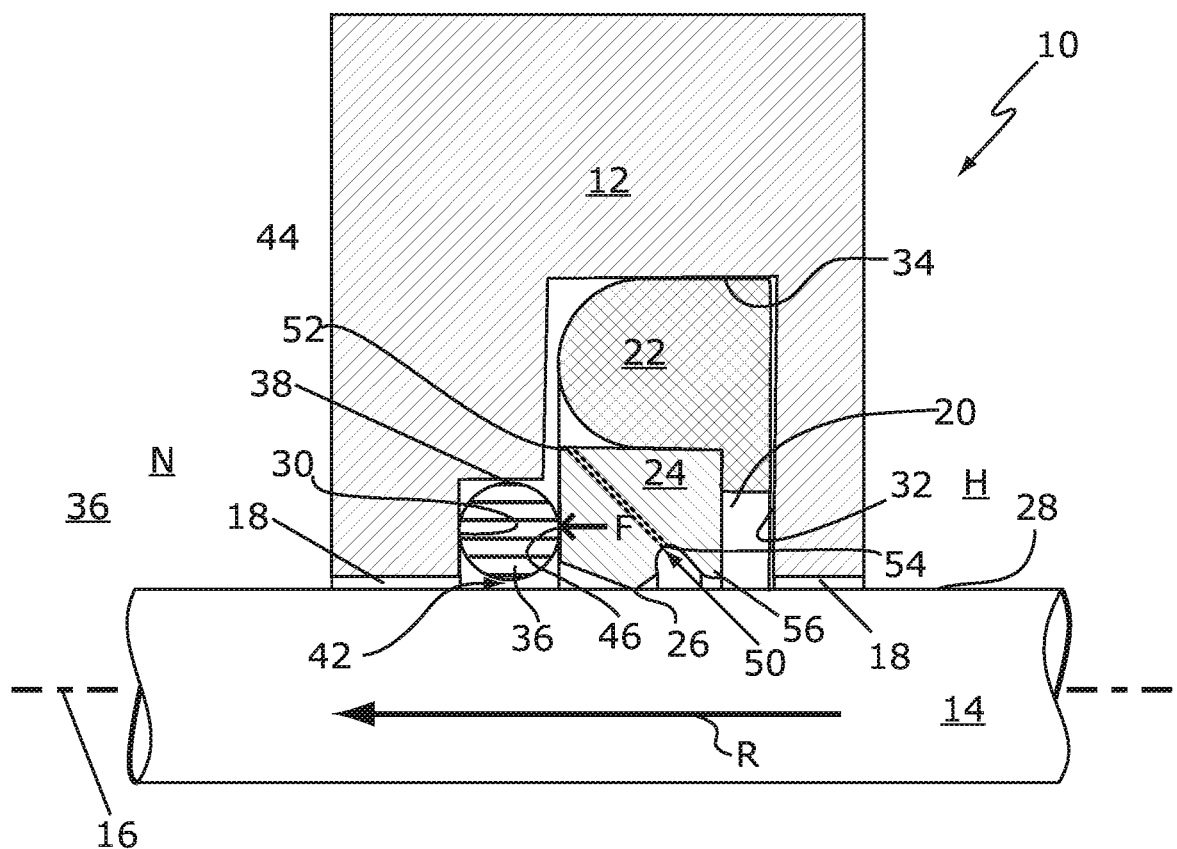
FIG. 10 shows a seal arrangement in which the seal element is provided with a pressure compensation passage and with a supporting section, in a partial sectional illustration.

According to the embodiment of the seal arrangement 10 shown in FIG. 10, the seal element 24 can also be provided with a pressure compensation passage 50. In particular, the pressure compensation passage 50 can extend through the seal element 24 and have a first opening 52 arranged on the low-pressure side and a second opening 54 arranged on the high-pressure side.

In the normal operation of the seal arrangement 10, the first opening 52 of the pressure compensation passage 50 is sealed off from the low-pressure side N by the preloading element 22 or, as shown in FIG. 10, by the damping member 36. In the event that a pressure prevailing on the low-pressure side N exceeds a pressure prevailing on the high-pressure side H, the seal element 24 or the damping member 36 can be moved axially in the direction of the high-pressure side H by the pressure gradient between the low-pressure side N and the high-pressure side H. A fluidic connection between the first opening 52 of the pressure compensation passage 50 and the low-pressure side N can thereby be achieved. In this way, pressure compensation between the low-pressure side N and the high-pressure side H is made possible.

According to a development of the invention, the seal element 24 can have a supporting section 56 shown in FIG. 10, which is arranged spaced apart in the axial direction from the sealing edge 26 on the high-pressure side. The supporting section can rest partially on the sealing surface 28 of the second machine part 14.

The operation of the seal arrangement 10 according to the invention is explained in greater detail below with reference to FIGS. 1 to 5:

When the high-pressure region H of the seal arrangement 10 is pressurized or there is a movement of the second machine element 14 relative to the seal element 24 in direction R, the seal element 24 is pressed axially in the direction of and against the damping member 36. The seal element 24 is supported on the damping member 36. The damping member 36 is pressed against the low-pressure-side groove flank 30 of the holding groove 20 by the seal element 24 with the contact pressure force F and—owing to its lower elasticity coefficient relative to the material of the seal element—is compressed in the axial direction. During this process, the damping member 36 is deformed radially in the direction of the sealing surface 28 of the second machine part 14 (FIG. 2). The damping member 36 protrudes from the holding groove 20, at least when the high-pressure side H of the seal arrangement 10 is pressurized with a maximum operating pressure. As a result, the damping member 36 partially displaces (covers) the sealing gap 18 between the two machine parts 12, 14 in an axial direction. As a result, the damping member 36 serves as a dynamic barrier element, by means of which plastic deformation and hence damage/destruction of the seal element 24 or the extrusion thereof in the direction of the movement axis 16 and into the sealing gap 18 formed between the two machine parts 12, 14 is counteracted. In the seal arrangement according to the invention, the seal element 24 can, as a result, be given smaller dimensions overall and/or can be formed from a material which is less resistant to mechanical loads than the polytetrafluoroethylene which is usually used. Thus, the seal element 24 can be composed, in particular, from some other fluoropolymer or a fluorinated copolymer, e.g. with PTFE monomer units, with an even lower friction coefficient than polytetrafluoroethylene.

Figure 11:
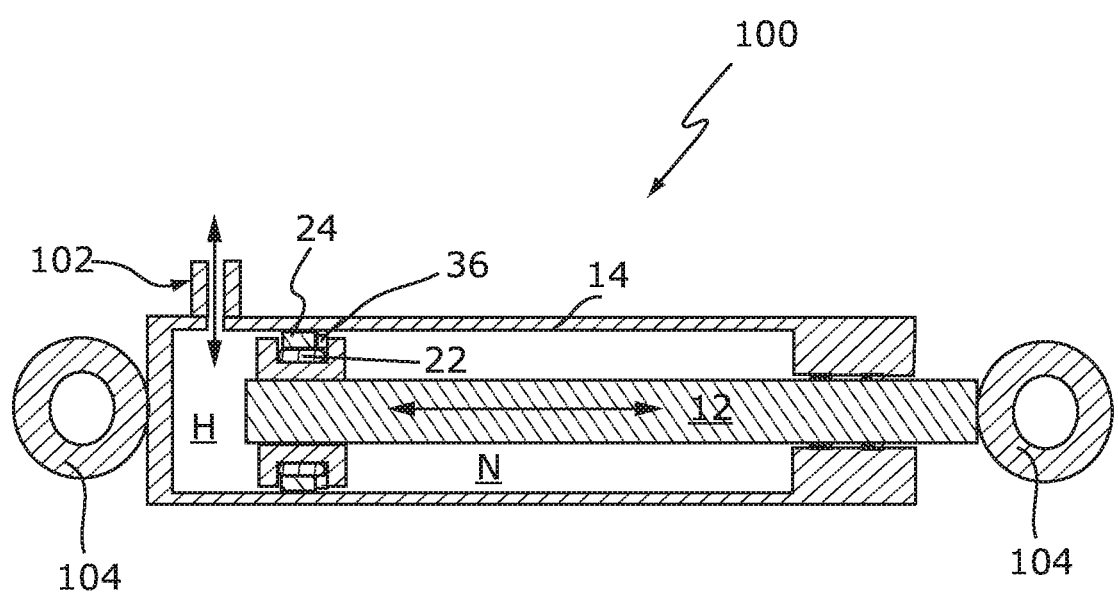
FIG. 11 shows a hydraulic actuator having a seal arrangement according to the invention.

By way of example, FIG. 11 shows the use of the seal arrangement 10 according to the invention in a single-acting shock damper or a hydraulic actuator 100 of the kind that can be used in construction vehicles or construction machines.

The actuator 100 comprises a seal arrangement 10 explained above. Purely by way of example, the seal arrangement shown is designed in a manner corresponding to the seal arrangement shown in FIG. 1. It should be noted that, in the present case, the first machine part 12 of the seal arrangement 10 is designed as a piston rod, while the second machine part 14 of the seal arrangement 10 is designed as a hydraulic cylinder.

As is apparent from FIG. 11, the seal element 24 and the preloading element 22 are arranged in the holding groove 20 of the piston rod.

A connection stub, denoted by 102, of the hydraulic linear motor 100 is used to supply a working fluid for actuating the piston rod, i.e. for moving the piston rod relative to the hydraulic cylinder in the movement or working direction denoted by R. The hydraulic actuator 100 has fastening means 104 on the hydraulic cylinder and on the piston rod for fastening the actuator on two components to be moved relative to one another.

It is self-evident that the shock damper or hydraulic actuator 100 can also be of double-acting design. In this case, two pistons surfaces situated opposite one another can be subjected to hydraulic fluid, with the result that the actuator 100 has two active movement or working directions R. In this case, the seal arrangement 10 can have a second damping member, which is arranged axially between the high-pressure-side groove flank and the seal element 24.

The seal arrangements 10 explained above in conjunction with FIGS. 1 to 11 can also be used in other engineering components, e.g. in a shock or vibration damper, in particular for motor vehicles.

What is claimed is:

1. A seal arrangement comprising:
   a first machine element and a second machine element, which are arranged spaced apart, forming a sealing gap, wherein the first and second machine elements are movable in translation relative to one another along a movement axis;
   a seal element having a sealing lip, wherein at least a section of the seal element is arranged in a holding groove in the first machine element and which serves to seal off a low-pressure region from a high-pressure region of the seal arrangement, the seal element is composed of polytetrafluoroethylene or of fluoropolymer;
   a rubber-elastically deformable preloading element which is arranged in the holding groove and which serves to preload the seal element with the sealing lip thereof against a sealing surface of the second machine element; and
   at least one elastically deformable damping member for axial support of the seal element, wherein at least a section of the at least one elastically deformable damping member is arranged between a groove flank, arranged on the low-pressure region, of the holding groove and the seal element in the axial direction, the damping member is composed of an elastomer that can be deformed with a constant volume;

wherein a free space is formed between the damping member and the sealing surface of the second machine part, said free space being delimited in a radial direction by the sealing surface of the second machine element and an inner wall, facing the sealing surface, of the damping member;

wherein the damping member is compressed in an axial direction of the movement axis by the seal element when the high-pressure region is subjected to pressure and can be deformed freely into the free space;

wherein the damping member partially covers the sealing gap in the axial direction in the pressurized state of the high-pressure region of the seal arrangement; and wherein the damping member is composed of a material having a lower elasticity modulus than the elasticity modulus of the material of the seal element.

2. The seal arrangement as claimed in claim 1, wherein the damping member is supported on the first machine element by an end of the damping member facing away from the second machine element.

3. The seal arrangement as claimed in claim 2, wherein the damping member is supported on the first machine element directly or via the preloading element.

4. The seal arrangement as claimed in claim 1, wherein the damping member is arranged loosely in the holding groove.

5. The seal arrangement as claimed in claim 1, wherein the damping member is secured on the seal element or on a low-pressure-side groove flank of the holding groove.

6. The seal arrangement as claimed in claim 1, wherein the seal element comprises a fluorinated copolymer.

7. The seal arrangement as claimed in claim 1, wherein the seal element is arranged with axial play in the holding groove.

8. The seal arrangement as claimed in claim 1, wherein one of the two machine parts is designed as a cylinder and the other of the two machine parts is designed as a piston rod guided in the cylinder, wherein the seal element is a radial seal element.

9. A shock damper or hydraulic actuator having a seal arrangement, the seal arrangement comprising:
 a first machine element and a second machine element, which are arranged spaced apart, forming a sealing gap, wherein the first and second machine elements are movable in translation relative to one another along a movement axis;
 a seal element having a sealing lip, wherein at least a section of the seal element is arranged in a holding groove in the first machine element and which serves to seal off a low-pressure region from a high-pressure region of the seal arrangement, the seal element is composed of polytetrafluoroethylene or of fluoropolymer;
 a rubber-elastically deformable preloading element which is arranged in the holding groove and which serves to preload the seal element with the sealing lip thereof against a sealing surface of the second machine element; and
 at least one elastically deformable damping member for axial support of the seal element, wherein at least a section of the at least one elastically deformable damping member is arranged between a groove flank, arranged on the low-pressure region, of the holding groove and the seal element in the axial direction, the damping member is composed of an elastomer that can be deformed with a constant volume;
 wherein a free space is formed between the damping member and the sealing surface of the second machine part, said free space being delimited in a radial direction by the sealing surface of the second machine element and an inner wall, facing the sealing surface, of the damping member;
 wherein the damping member is compressed in an axial direction of the movement axis by the seal element when the high-pressure region is subjected to pressure and can be deformed freely into the free space;
 wherein the damping member partially covers the sealing gap in the axial direction in the pressurized state of the high-pressure region of the seal arrangement; and
 wherein the damping member is composed of a material having a lower elasticity modulus than the elasticity modulus of the material of the seal element.

10. A shock damper or hydraulic actuator having a seal arrangement configured to seal off a low-pressure region from a high-pressure region, the seal arrangement comprising:
 a first machine element and a second machine element, which are arranged spaced apart, forming an annular gap, wherein the first and second machine elements are movable in translation relative to one another along a movement axis;
 an annularly shaped holding groove disposed within the first machine element, the holding groove defined as having a low-pressure side groove flank opposite a high-pressure side groove flank;
 a seal element having a sealing lip, wherein at least a section of the seal element is arranged in the holding groove of the first machine element, the seal element sealing off the low-pressure region from the high-pressure region of the seal arrangement, the seal element is composed of polytetrafluoroethylene or of fluoropolymer;
 a rubber-elastically deformable preloading element arranged in the holding groove and preloading the seal element with the sealing lip against a sealing surface of the second machine element;
 at least one elastically deformable damping member for support of the seal element along the movement axis, wherein at least a section of the at least one elastically deformable damping member is arranged between the low-pressure side groove flank and the seal element, the damping member is composed of an elastomer that can be deformed with a constant volume;
 wherein an annular free space is formed between the damping member and the sealing surface of the second machine part, said annular free space being delimited in a radial direction by the sealing surface of the second machine element and an inner wall of the damping member, the inner wall facing the sealing surface;
 wherein the damping member is compressed in an axial direction along the movement axis by the seal element when the high-pressure region is subjected to pressure and can be deformed freely into the free space;
 wherein the damping member partially covers the annular gap in the axial direction in the pressurized state of the high-pressure region of the seal arrangement; and
 wherein the damping member is comprised of a material having a lower elasticity modulus in comparison to the elasticity modulus of the material of the seal element.

* * * * *